United States Patent [19]
Hyatt et al.

[11] 4,358,672
[45] Nov. 9, 1982

[54] PAY PER VIEW TELEVISION CONTROL DEVICE

[75] Inventors: Robert K. Hyatt, Burlington, Conn.; Robert F. Jacobs, Irvington, N.Y.

[73] Assignee: The TeleMine Company, Inc., New York, N.Y.

[21] Appl. No.: 150,420

[22] Filed: May 16, 1980

[51] Int. Cl.³ .............................................. G06K 5/00
[52] U.S. Cl. .................................. 235/380; 235/381; 235/382; 235/484; 235/485
[58] Field of Search .............. 235/380, 381, 382, 493, 235/483, 484, 485, 486; 358/115; 340/825.33, 825.34, 825.35

[56] References Cited

U.S. PATENT DOCUMENTS

| | | | |
|---|---|---|---|
| 3,700,862 | 10/1972 | Snook | 235/493 |
| 3,890,461 | 6/1975 | Vogelman | 358/115 |
| 4,058,839 | 11/1977 | Dartany | 235/493 |
| 4,095,739 | 6/1978 | Fox | 235/382 |
| 4,197,988 | 4/1980 | Moss | 235/381 |

Primary Examiner—Harold I. Pitts
Attorney, Agent, or Firm—J. David Dainow

[57] ABSTRACT

A method and apparatus for providing access to an electrically controlled service for perdetermined periods of time employs a dual magnetically striped record medium encoded in a CRB format with data indicative of the periods of time during which access is to be provided. The data is read by a reader and stored in a processor having an internal clock and a comparator for comparing the instantaneous time output of the clock with the predetermined time period data encoded on the record medium for enabling a security device only when the instantaneous time is within the predetermined time period.

13 Claims, 7 Drawing Figures

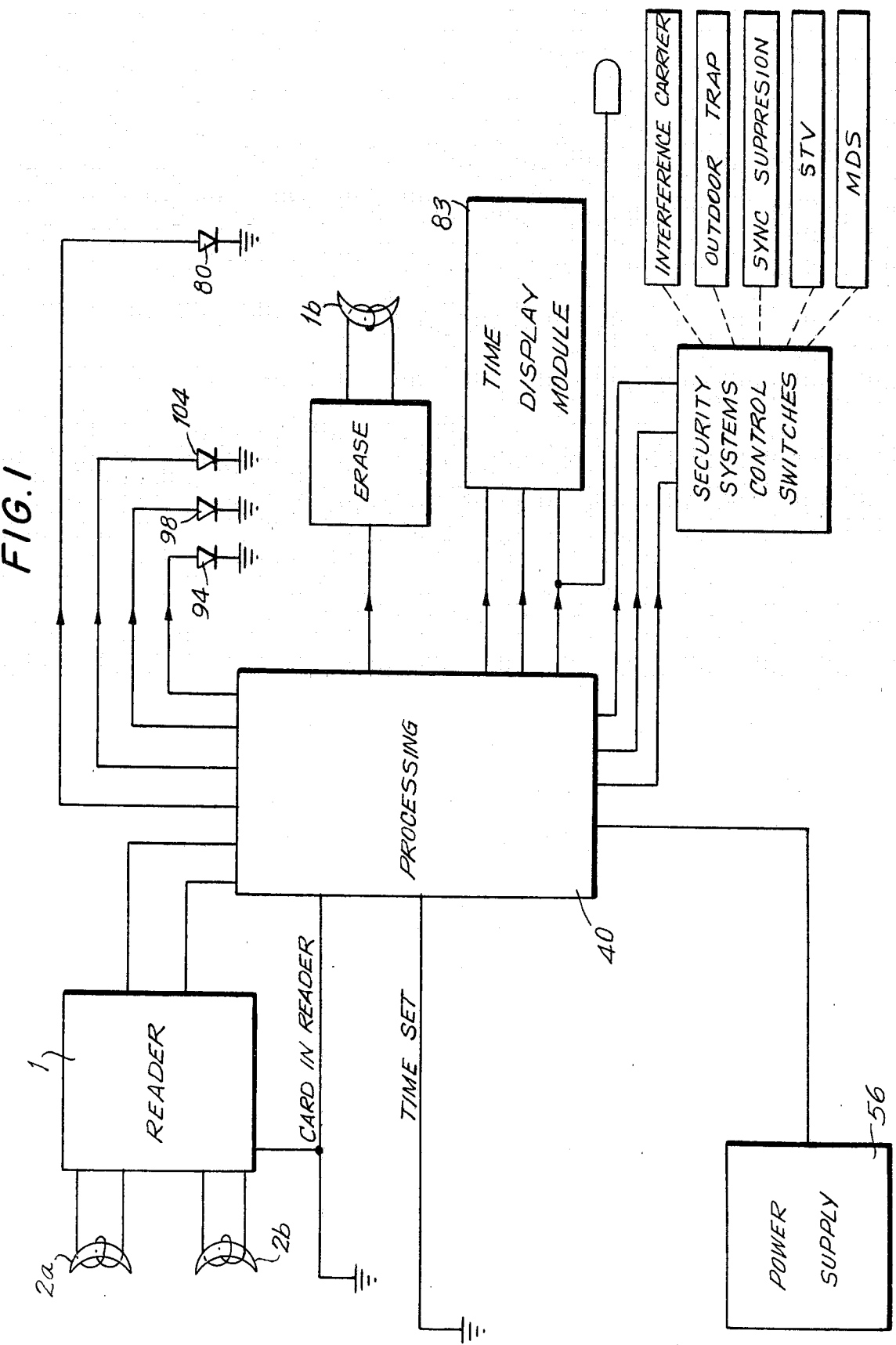

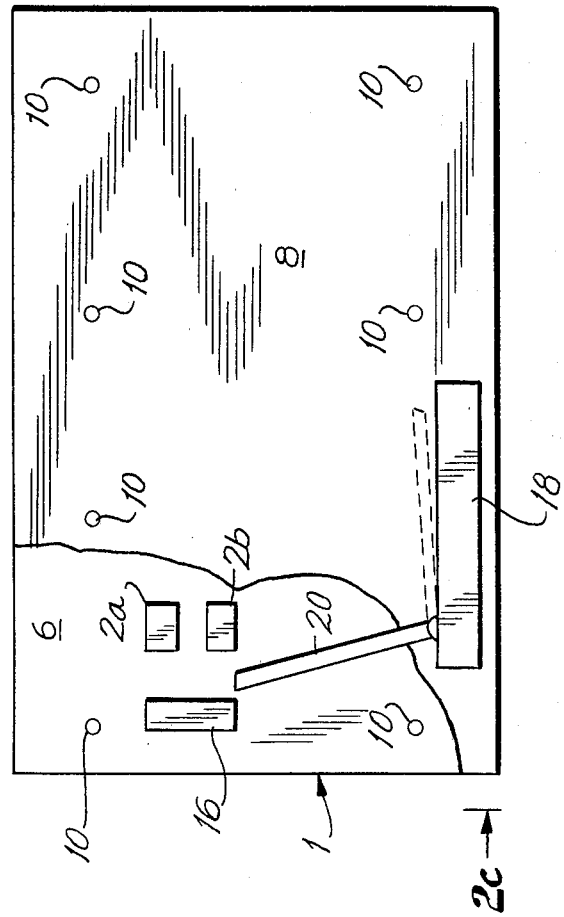
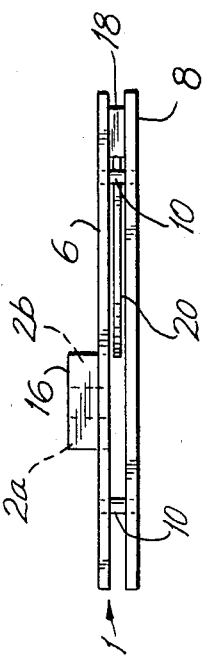
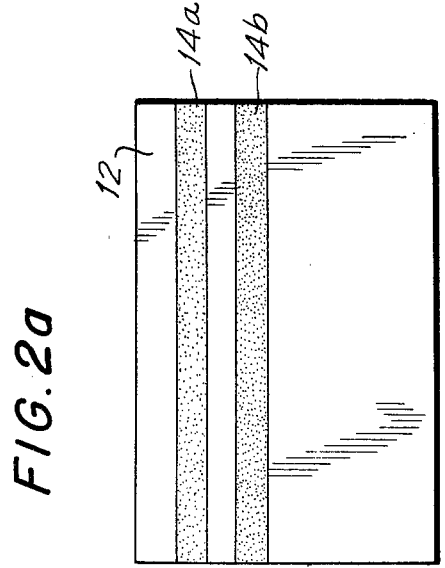

PAY PER VIEW TELEVISION CONTROL DEVICE

BACKGROUND OF THE INVENTION

The present invention relates to apparatus for limiting access to an electrically controlled service to authorized users of the service. More specifically, the present invention concerns apparatus for enabling a security device which, when disabled, prevents unauthorized persons from gaining access to a service which is readily available to the user but for the impedance of the security device. The invention has numerous applications, as will subsequently be shown, one of which is in controlling access by television viewers to subscription television services.

Community antenna television (CATV) enables subscribers to receive an enhanced signal carrying television programs broadcast on standard television channels, typically over cables connected to viewers' receivers, for improved program reception. As an adjunct to the broadcast for publically available programming, CATV operators have offered pay TV services wherein subscribers are supplied with additional channels of TV programming, not publicly available, in return for payment of a fee which, depending on the nature of the subscription service, may be a periodic fee, e.g. monthly, or a single usage fee which entitles the viewer to television viewing of a specific channel of programming during a preselected time period. CATV services may include the provision of several channels of television viewing which may be individually or collectively made available to subscribers. For example, one channel of television viewing may include first run movies or live theater plays; another may provide sports events; while still another channel may provide a schedule of television programs not available on the public access channels.

In order to limit viewing of special programs to paying subscribers, it is necessary to be able to selectively enable and disable the apparatus which provides to each subscriber's television receiver, a signal suitable for viewing. As this cannot be feasibly done by having a technician from the CATV operator visit the subscriber's home before and after each program is viewed to perform the enabling and disabling operation, since it would be extremely costly, other methods of restricting access to TV programs are necessary. One approach to overcoming the need to send a technician to a subscriber's home is to enable and disable the subscriber's access to programming by remote control through the transmission of enabling and disabling signals to each subscriber's residence by complex transmitters and receivers and intermediary connecting lines. The apparatus required to accomplish remote control is complex and expensive and can only be feasibly used where there are a large number of subscribers among whom the cost of the equipment can be amortized over a period of time. The initial startup costs for assembling such a system and the uncertainty of the number of subscribers who can be expected to participate has discouraged smaller CATV operators from providing single program viewing services. Examples of systems which require the transmission of data from the CATV operator to the subscriber's television receiver are found in the U.S. Pat. No. 3,890,461 to Vogelman for a Ticket Operated Subscription Television Receiver and U.S. Pat. No. 4,058,830 to Guinet, et al for One Way Data Transmission System. The systems described in the foregoing patents rely on comparison between the transmitted data and data on a card furnished to the television subscriber.

It is also known that a magnetically encoded ticket or record medium can be used to actuate a switching device for energizing an electrical mechanism such as an electrically operated gate for permitting access to building or a depository in a bank. Such tickets, however, do not lend themselves to use for limited subscription television viewing since they can be re-used indefinitely and, hence, once supplied to a subscriber provide no way of limiting the time during which TV access permitted by the ticket or record medium can be obtained. One attempt to remedy this problem is disclosed in the aforementioned Vogelman patent which discloses the destruction of the information on the data ticket by destroying the ticket with a motor operated device.

It is also known in the art to employ a magnetic stripe to actuate a security device for enabling television viewing. Such a device is disclosed in U.S. Pat. No. 4,012,583 to Kramer for a pay TV control system which discloses a motel room key having a magnetizable stripe which permits a guest of the motel to gain access to television programs for viewing on a television receiver in his room. However, no information is encoded on the magnetizable stripe of the key in the Kramer patent so that the time of viewing or channels to be viewed cannot be selectively controlled.

Thus, while it is seen that the prior art includes devices for or adaptable to gaining access to subscription television services, those which can economically be provided only at a subscriber's television receiver are very limited as to flexibility in controlling time and channel access, while systems which permit greater flexibility are complex and expensive and require transmission of special information from the television broadcasting head end to subscribers in addition to the television viewing signals.

SUMMARY OF THE INVENTION

The instant invention overcomes the aforementioned problems of the prior art in teaching the construction of and method of operating apparatus for providing access to an electrically controlled service for predetermined periods of time including a record medium adapted to have encoded on it data indicative of a definite time period during which access to the service is to be permitted and one or more sub-periods within a time period which sub-periods can be coextensive with or of shorter duration than the time period, a reader adapted to receive the record medium and store the data encoded thereon, a processor including a clock circuit having an output signal indicative of instantaneous time, including date, hour, minute and second, and a comparator for comparing the data stored in the reader with the clock output signal, and a security device operable in at least two states, one of which permits access to the service and the other of which prevents access to the service, the security device being responsive to the comparator for permitting and preventing access to the service as a function of the data encoded on the record medium and the instant time signal output of the clock. The invention provides for a dual head reader for reading data encoded on a data card, having parallel magnetic stripes, by the complementary return to bias method. The processor which compares the data encoded on the magnetic stripes with data generated by the internal clock controls a plurality of channels of programming each of which can function in a plurality of programming modes. Means for erasing the data encoded on the magnetic stripes after the data is read and stored is also provided. The apparatus of the invention can be employed in conjunction with numerous types of security devices.

It is therefore an object of the invention to provide access to an electrically controlled service through the use of a disposable card having data encoded thereon which can be furnished to a subscriber in return for advance payment.

Another object of the invention is to provide selective access to an electrically controlled service for predetermined periods of time without necessity for gaining access to the appliance which renders the service.

Still another object of the invention is to provide access to an electrically controlled service by means of an apparatus which is compatible with numerous types of available and future security devices.

A further object of the invention is to provide selective access to an electrically controlled service for a continuous predetermined period of time.

Still a further object of the invention is to provide selective access to an electrically controlled service during predetermined discrete sub-periods of time within an overall time period.

An additional object of the invention is to provide access to an electrically controlled service for a predetermined time duration immediately upon application of a data card to a card reader at the location of the service rendering appliance.

Other and further objects of the invention will be apparent from the following drawings and description of a preferred embodiment of the invention in which like reference numerals are used to designate like parts in the various views.

DESCRIPTION OF THE DRAWINGS

FIG. 1 is a functional block diagram of the apparatus of the preferred embodiment of the invention;

FIG. 2a is a plan view of a data card suitable for use with the apparatus of the preferred embodiment of the invention;

FIG. 2b is a plan view of an apparatus for receiving the data card of FIG. 2a in accordance with the preferred embodiment of the invention;

FIG. 2c is an elevation view of the apparatus shown in FIG. 2b.

DESCRIPTION OF THE PREFERRED EMBODIMENTS

Figure 3:
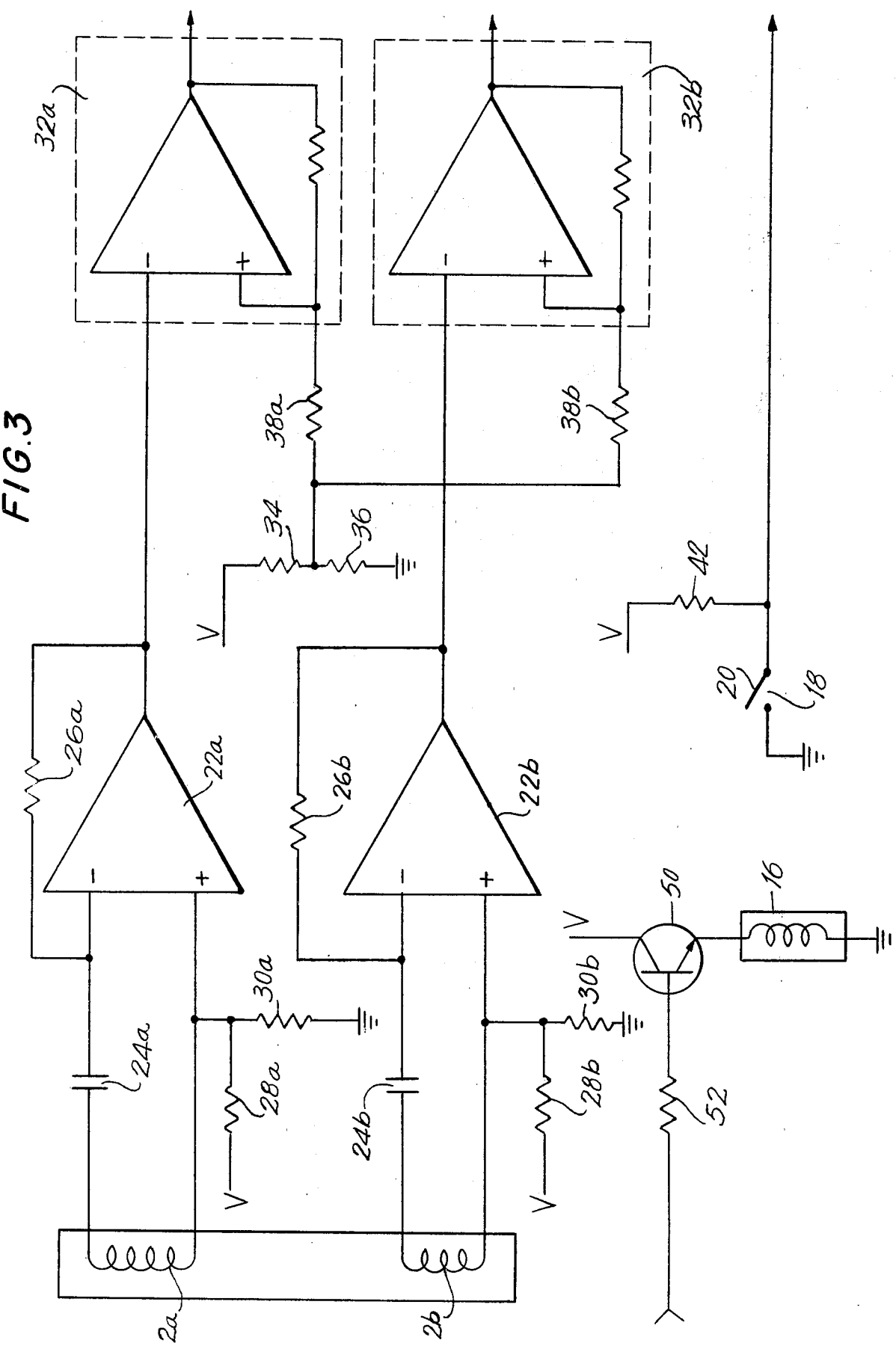
FIG. 3 is an electrical schematic diagram of the circuitry employed in the card reader of the preferred embodiment of the invention.
Figure 4:
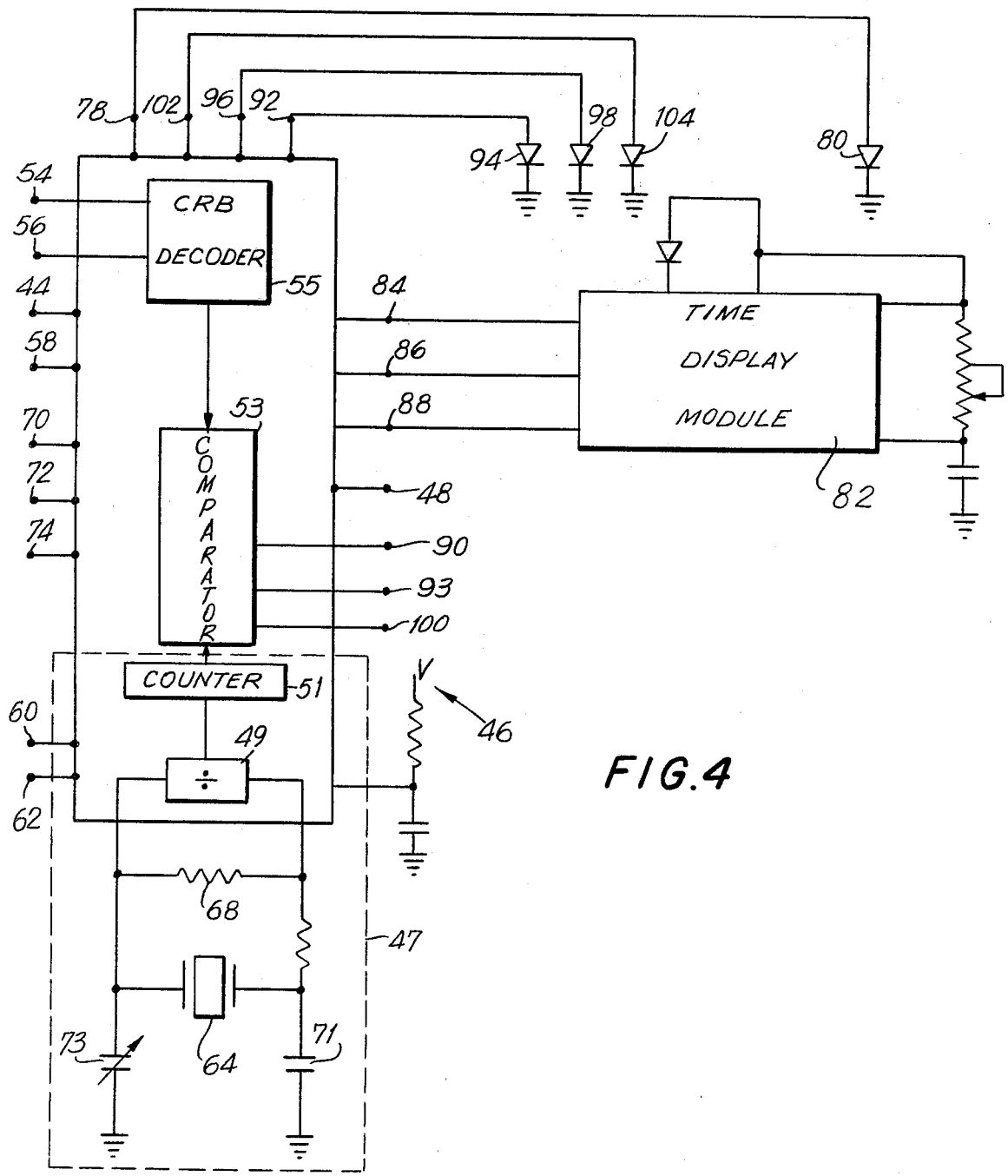
FIG. 4 is a schematic signal flow diagram of the processor circuitry employed in the apparatus of the preferred embodiment of the invention.

Referring now to the drawings, there is shown in FIG. 1 a functional block diagram of the apparatus of the preferred embodiment of the invention. The apparatus includes a reader 1 with magnetic reading heads 2a and 2b which are mounted on the card reader assembly 1. The magnetic read heads 2a and 2b can be similar to those employed in conventional tape cassette readers the construction of which will be known to those skilled in the art. The card reader assembly 4 includes a top plate 6 and a bottom plate 8 which are mutually connected in parallel spaced relationship by spacer posts 10 to form a channel having a cross section congruent to the cross section of the card 12, therebetween for slidably receiving a data card 12 longitudinally inserted into the channel while preventing rotation or skewing of the card 12. On the data card 12 there are coded two parallel spaced magnetic stripes 14a and 14b having axes parallel to the axis of the channel along which the card 12 is translated as it is inserted into the reader 1, which are adapted to have encoded thereon, data specifying the channels of service to be offered to the subscriber and the times during which access to the service on each channel is to be provided. Mounted on the upper plate 6 adjacent and in longitudinal alignment with the data reading heads 2a and 2b is a magnetic erase head 16. The magnetic erase head 16 is energized to erase the data encoded on the card 12 only after the data has been read as will be described.

In order to sense the presence of a magnetically striped data card 12 in the card reader assembly a conventional mechanical switch 18 has an actuator arm 20 disposed in the channel of the card reader 1 for receiving the data card 12. Insertion of the data card 12 into the card reader 1 causes the switch 20 to pivot rearwardly thereby causing the normally open switch 18 contacts to close.

Referring additionally to FIG. 3 of the drawings, it is seen that the magnetic reading heads 2a and 2b include inductive coils which are respectively connected to the inputs of amplifiers 22a and 22b. Filtering of noise and other unwanted signals appearing at the outputs of the coil 2a and 2b is provided by capacitors 24a and 24b respectively. Each of the amplifiers 22a and 22b is provided with a respective feedback loop having a resistor 26a and 26b respectively.

A 5 volt bias voltage is applied to the positive input of amplifier 22a through a voltage divider circuit including resistor 28a and resistor 30a. Similarly a 5 volt bias signal is applied to the positive input of amplifier 22b through a voltage divider circuit including a resistor 28b and a resistor 30b.

The output of the amplifier 22a is applied to the input of a Schmitt trigger 32a. Similarly the output of amplifier 22b is applied to the input of a Schmitt trigger 32b. Bias voltage is applied to the Schmitt trigger circuits 32a and 32b by means of a common voltage divider circuit including resistors 34 and 36 and respective input resistors 38a and 38b which are connected to the respective positive inputs of the Schmitt trigger circuits 32a and 32b respectively.

The two magnetic stripes of the data card 12 are encoded in accordance with the complementary return to bias (CRB) method. Complementary return to bias is a two track technique which has heretofore been used in applications which permitted the low density bit rates and wide band width attending the method but has not been used for selective access to services which are electrically controlled and, in particular, to subscription television services. In CRB encoding, each data cell on the record medium is set to one of four states. In the first state which represents a no data condition, both tracks are at magnetic south. In the second state which represents a zero, the first track is at magnetic south and the second track is at magnetic north. In the third state which represents a binary one, the first track is at magnetic north and the second track is at magnetic south. The fourth state wherein both tracks are at magnetic north can be used as an end of byte or other framing signal to separate data words. Because of the inherent inefficiency of CRB due to low density bit rates, CRB has been believed, until now, to be unsuitable for use in subscription television service applications. In addition the art has avoided CRB due to the necessity for wide band widths which are believed to increase vulnerability to noise and the susceptibility of the two track technique to skewing problems. However, CRB utilizes a reasonably simple logic network and has been found within the teachings of the invention, to be both a cost effective and highly reliable method of encoding data cards for subscription television use as employed in conjunction with the apparatus of the invention.

The magnetic impulses recorded on the dual stripes 14a and 14b of the data card 12 induce voltage pulses at the outputs of the read coils 2a and 2b which are amplified by the feedback amplifiers 22a and 22b. The irregular pulse signal outputs of the amplifiers 22a and 22b are converted to square wave pulses by the Schmitt triggers 32a and 32b respectively and then applied to a central processor 40.

As can be seen with reference to FIG. 3 the switch 18 is connected at one end to ground and at the other to a resistor 42 and parallel with input terminal 44 of a processor logic circuit in the central processor 40. The opposite end of the resistor 42 is connected to a 5 volt power supply. When the switch 20 is open, that is when there is no data card 12 in the card reader, the 5 volt signal appears at the input terminal 44 of the processor circuit 46 thereby indicating that there is no data card in the reader. When the data card 12 is inserted in the reader 1, the switch arm 18 is pushed rearwardly thereby closing the switch 20 and bringing the input terminal 44 of the logic circuit 46 to ground potential thereby signalling the presence of the data card 12 in the card reader 1.

When it is desired to erase the data encoded on the magnetic stripes 14a and 14b of the data card 12, in order to prevent reuse of the card, an erase signal appears at output terminal 48 of the logic circuit 46. The positive signal at the output terminal 48 is applied to the base of a transistor 50 through base resistor 52. The positive signal at the base of the transistor 50 turns the transistor on thereby permitting current to flow from the 5 volt power supply through the collector to emitter junction of the transistor 50 and then to ground through the erase head 16. A single erase head 16 can be provided spanning both of the magnetic stripes or separate respective heads can be provided for erasing the data encoded on the dual magnetic stripes 14a and 14b. The data square wave pulse outputs of the Schmitt triggers 32a and 32b are applied to input terminals 58 of the processor circuit 46 to indicate whether proper AC power is being supplied to the system. A backup rechargeable battery is provided to provide sufficient power to run the system in the event there is an AC power failure. Upon indication from the signal applied to terminal 58 of the processor 46 that there has been an interruption in the AC power, the processor circuit 46 causes the backup battery voltage to be applied to power the apparatus. The battery power is supplied to the processor circuit 46 at input terminals 60, 62 and 64. In addition to its backup function, the battery provides the 5 volt bias used in the system as previously described.

A 32 kHz oscillator 64 provides timing signals to the processor circuit 46 through resistors 66 and 68. Undesirable harmonics from the oscillator are shunted to ground through capacitors 71 and 73, capacitor 73 preferably being a variable capacitor for precise tuning.

The processor circuit 46, which can be a National Semi-Conductor integrated circuit COP420C, includes a clock network 47 which employs a frequency divider 49 and counter circuit 51 in cooperation with the oscillator 64, for generating instantaneous time signals indicative of the date, day, hour, minute and second, in a manner known to those skilled in the art. Input terminals 70, 72 and 74 are provided on the processor circuit 46 for receiving clock setting signals which can be applied to the processor circuit 46 for initially setting the clock network 47 therein to the current data and time. The setting of the clock network 47 in the processor 46 is preferably done by the manufacturer or distributor of the apparatus before delivery to the consumer for installation on a television receiver. Instead of applying the clock setting signals directly to the processor circuit 46, clock setting signals can be encoded on a magnetic card and read by the card reader 1. An output signal from the card reader responsive to the clock setting signals encoded on the magnetic card can be applied to the processor circuit 46 to set the clock network of the processor 46 to the appropriate date and time.

Upon insertion of the data card 12 into the reader, the data on the card is read and analyzed by the processor circuit 46 which includes a CRB decoder 55. If the data is of proper format and deemed valid, a signal appears at output terminal 78 of the processor circuit 46 to energize a light emitting diode 80 thereby causing the diode 80 to light and indicate that the data card 12 has been accepted. In the absence of valid data, there is no change in the state of the output 78 and the light emitting diode 80 remains extinguished.

Clock data developed in the processor 46 is applied to the input of a time display module 82 which includes the decoding and driving circuitry for a digital time display 83 which displays the instantaneous time. An output signal appearing at terminal 84 of the processor circuit 46 enables the time display module 82 to receive the instantaneous time data from the clock network 47 in the processor 46. Only when the clock data is valid does the enable signal appear at the output terminal 84 of the processor circuit 46. The clock data itself appears at output terminal 86 of the processor circuit 46 and is applied to a respective input of the time display module 82. Output terminal 88 of the processor circuit 46 is also connected to the time display module 82 for setting the initial time for display and feeding data to the time display module 82. The time display module 82 decodes the incoming data from the clock 47 and provides appropriate output signals for digital display. The time display module 82 is a component known to the art and can be an integrated circuit having the manufacturer's designation NSM4000A.

The apparatus of the preferred embodiment of the invention is capable of activating up to three channels of programs in one of three modes of operation or a combination of modes. The channel or channels to be activated are defined by the data encoded on the data card 12 as are the time periods during which the data card 12 is valid and the sub-periods, within the time periods in which the data card 12 is valid during which viewing on each of the channels is to be permitted. A sub-period can encompass the entire time period during which the data card 12 is valid, or can be a shorter period of time included in the time period during which the data card 12 is valid.

There are three modes of operation of the apparatus of the preferred embodiment of the invention. These modes of operation which have application in controlling access to subscription television services are conveniently designated pay per month, pay per view and wild card. In pay per month operation data encoded on the dual magnetic strips of the data card 12 designate one or more of the three channels and one month in which the data card 12 is valid. Upon acceptance of the data on the card 12 by the reader, the LED 80 is energized and lighted and the erase signal appears at the output terminal 48 of the processor circuit 46 for enabling the erase head 16 to erase the data encoded on the data card 12. When the data card is completely removed from the reader, the removal of the card is sensed by the switch 18 and the processor circuit 46 determines whether to enable the channel or channels designated in the encoded data for television reception. The data encoded on the card which is indicative of the month in which the card is valid is compared by a comparator 53 with data generated by the clock network 47 internal to the processor 46 and, as long as there is a correspondence between the two wherein the instantaneous time recorded by the clock 47 is within the month during which the card is valid, the channel or channels designated in the encoded card data are enabled.

When a channel is enabled, an enable signal appears at a respective channel enable output terminal of the processor circuit 46 and an enable LED indicator signal also appears at a corresponding output of the processor circuit 46. Hence when the first of three channels of the preferred embodiment of the invention is enabled, an enable signal appears at output terminal 90 of the processor circuit 46 and an LED energizing signal appears at output terminal 92 of the processor 46 to cause light emitting diode 94 to light. Similarly, when the second channel is enabled, an enabling signal appears at output terminal 96 to light the diode 98. When the third channel is enabled an enabling signal appears at processor output terminal 100 and a light emitting diode energizing signal appears at processor output terminal 102 to energize and light a corresponding light emitting diode 104.

Output terminals 90, 93 and 100 of the processor circuit 46 are each connected to a respective security device known to those skilled in the art for enabling or disabling television reception on the respective channel or for providing access to another electrically controlled service.

Figure 5:
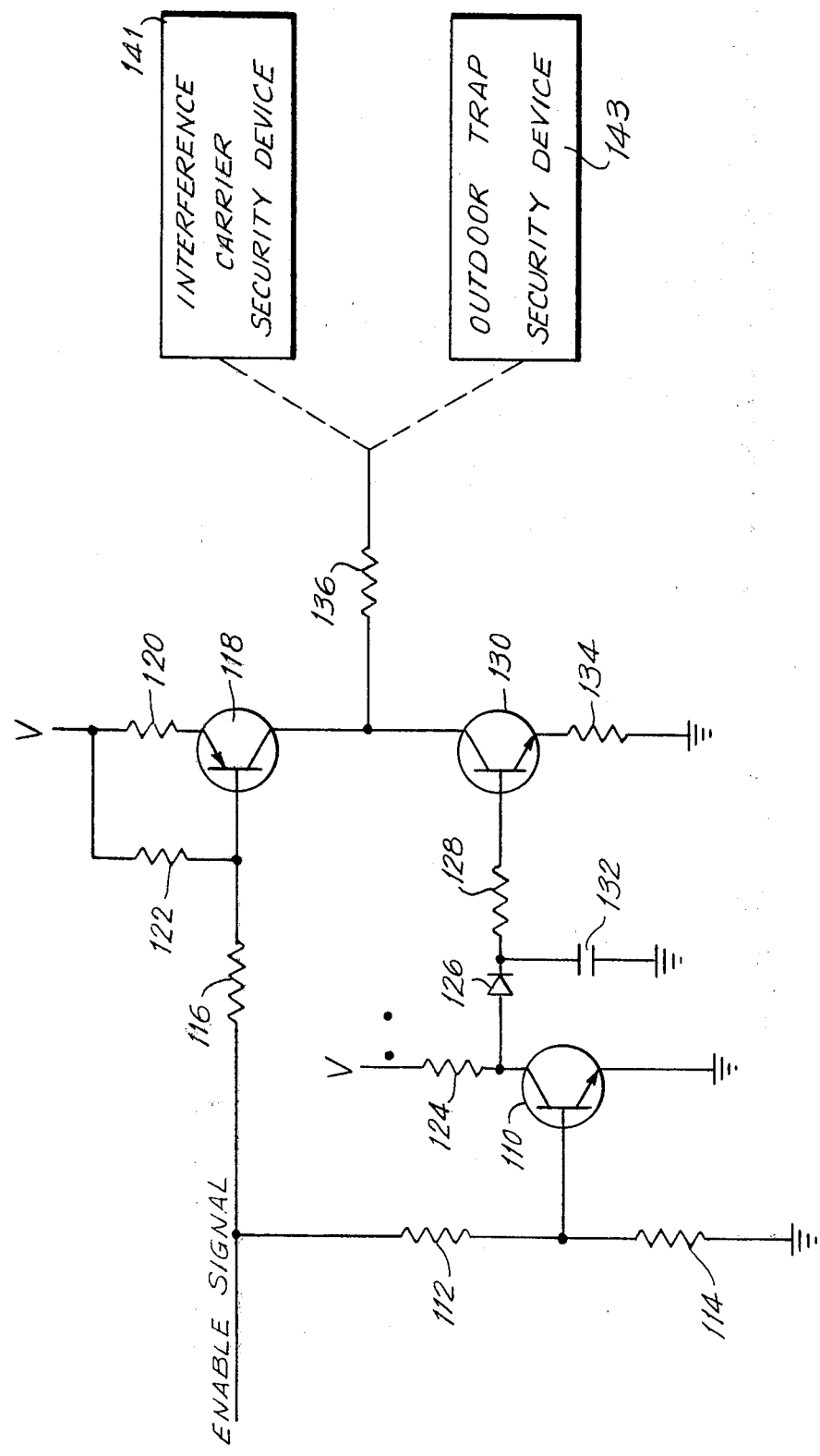
FIG. 5 is an electrical schematic diagram of a security device suitable for use in the apparatus of the preferred embodiment of the invention.

A switching circuit for controlling a security device suitable for use in subscription television systems which employ either an interference carrier security device 141 or an outdoor negative trap security device 143 is shown in FIG. 5. An enable signal from one of the outputs 90, 93 and 100 of the processor circuit 46 is applied to the base of a transistor 110 of a switching circuit through voltage divider action by resistors 112 and 114. The enable signal is simultaneously applied through resistor 116 to the base of a transistor 118, the emitter and base of which are biased by a 9 volt DC voltage applied through resistors 120 and 122 respectively. DC bias is also applied through resistor 124 to the collector of transistor 110 which is in turn connected to a diode 126 and resistor 128 to the base of a transistor 130. High frequency suppression of output signals at the collector of the transistor 110 is provided by a grounded capacitor 132 connected between the diode 126 and resistor 128. The emitter of transistor 130 is connected to ground through resistor 134.

The collectors of the transistors 118 and 130 are adapted to be connected to the security device 141 or 143 through a resistor 136.

When an enable signal is applied to the previously described switching circuit, a filter can be permitted to remove an interference carrier signal or prevent the signal blocking action of an outdoor negative trap. The enable signal can also be used to activate and deactivate other known switching circuits compatible with security devices presently known to the art including those used with synch suppression, STV (secure television) and MDS (multidistribution service).

A second mode of operation if the invention in a subscription TV environment is termed pay per view operation. In pay per view operation, the data encoded on the dual magnetic stripes 14a and 14b of the data card 12 can specify one, two, three or four time periods within the month in which the data card is valid. The time periods are specified both as to the specific time of the month they are initiated and by their respective durations which can be from one half hour to sixteen hours, each, in the preferred embodiment. The comparator 53 of the processor circuit 46 then compares the instant time data output of the clock 47 in the processor circuit 46 with the data encoded on the data card 12 indicative of the time period during which pay per view operation is to be enabled. Upon acceptance of the data card 12 by the reader, the LED 80 lights and the erase circuit is enabled to erase the data encoded on the data card 12 to prevent its reuse. By this technique the data, which can specify up to four periods of time during the month of validity, is stored in the processor circuit 46 for comparison with the instantenous clock data output to enable television viewing during the four periods.

Pay per view operation can be used in connection with pay per month operation. Where the two modes are to be used together, the pay per month data cards will have encoded on them four sub-periods of time during which viewing is not to be enabled as part of the normal monthly subscription service. Only if a pay per view data card is later inserted into the reader 1, which specifies one or more of the sub-periods as being permissible viewing time, can access to television programs be had during the sub-periods reserved on the monthly data card. By this method monthly service can be provided by subscription via a monthly data card which permits viewing on a single channel for the entire month except for certain predesignated sub-periods. Viewing during the predesignated sub-periods, which can be used to exhibit special broadcasts for which an extra charge is to be made, is then enabled by a separate data card, separately paid for, and intended to be read by the data card reader 1 only once during the month after which the data on the pay per view card is erased.

As the internal clock 47 within the processor circuit 46 provides output data indicative of current day and time, this information is compared by the comparator 53 with the data read from the monthly viewing card and additional data read from the pay per view card to determine whether or not an enable signal is to be provided on a specified channel at the current time.

Multiple pay per view cards can be used with each pay per view card specifying one or more of the reserved sub-periods in the monthly period for viewing.

Hence, if there are four special programs which are to be broadcast at predesignated times during the month, a subscriber can purchase a single data card 12 which will enable viewing of all four of the programs or he can purchase a datacard which will enable viewing of fewer than all four, e.g. one of the programs, and then later purchase one more additional cards to enable viewing of the remaining special programs. The cumulative sum of all of the time periods encoded on the multiple pay per view cards should not exceed the total number of time periods reserved during the monthly period of validity.

A third mode of operation for which the processor circuit 46 can be adapted is termed wild card operation. A data card 12 encoded for wild card operation is preferably encoded with data specifying the month of validity and a sub-period time duration. The initiation of the sub-period is not limited to any particular time during the month but takes place immediately upon insertion of the data card 12 into the reader 1 during the month validity. Hence, a data card may specify two hours of operation during the month of January. A subscriber desiring to view two hours of television broadcast during the month of January would insert the data card 12 into the reader at the time he wished to view a broadcast and the processor would then provide an enabling signal to the channel whose designation was encoded on the data card 12 for a continuous period of two hours after which the enabling signal would be terminated.

In the preferred embodiment of the invention, three channels of television viewing are provided for, each of which can be separately controlled by separate enable signals and respective security circuits. The three security circuits can be the same, e.g., all can be of the interference carrier type, or any two or all three of them can be different, e.g., one can be interference carrier, another synch suppression and the third STV.

It is to be appreciated that the foregoing description is of a preferred embodiment of the invention suitable for use in providing access to subscription television services for predetermined periods of time. However, the invention has application to the provision of access to virtually any electrically controlled service for a predetermined period of time. For example, the apparatus of the present invention could be used in connection with a security device which enables or prevents entry of a person to a facility such as a building or a transportation vehicle such as a train. Hence, access to a library could be regulated by a subscription basis by the mere furnishing of properly encoded data cards. Commuters on metropolitan subways or rail systems could purchase data cards on a monthly basis which permit access to the transportation system at preselected periods of time during the month. For example, data cards permitting access on week days during rush hour periods could be sold at one rate while data cards only permitting access on off-peak hours or during weekends could be sold for a lesser charge.

Although the invention has been described in connection with a preferred embodiment wherein three enable signals can be independently provided for controlling three channels of operation each of which can function in one of three modes, it is to be understood that within the teachings of the invention apparatus can be constructed for enabling fewer or greater numbers of channels than the three of the preferred embodiment. Moreover, while the modes of operation have been described in connection with a basic monthly renewable time period, other time periods of longer or shorter duration than the monthly period can be employed within the teachings of the invention sub-periods more than four in number and of duration beyond the ½ hour—16—hour range can also be provided within the teachings of the invention. Hence, it is to be appreciated that variations and modifications can be made to the preferred embodiment without departing from the spirit and scope of the invention which is set forth in the following claims.

What is claimed is:

1. Apparatus for providing access to an electrically controlled service for predetermined periods of time comprising:

a record medium adapted to have encoded thereon data indicative of a definite time period during which access to said service is to be permitted, a reader adapted to receive said record medium and store the data encoded thereon, said reader including a sensor for sensing the presence of said card therein and a housing having two closely spaced parallel plates and a plurality of posts disposed between said parallel plates to form a channel for slidably receiving said medium and guiding said record medium toward said sensor while preventing skewing thereof, a processor including a clock network having an output signal indicative of instantaneous time, a comparator for comparing the data stored in said reader with said clock output signal, and a security control device operable in at least two states, one of said states permitting access to said service and the other of said states preventing access to said service, said security device being responsive to said comparator for permitting and preventing access to said service as a function of the data encoded on said record medium.

2. Apparatus according to claim 1, wherein said record medium comprises dual magnetic stripes adapted to be encoded in CRB and said processor includes a CRB decoder.

3. Apparatus according to claim 1, wherein said sensor includes a mechanical switch having an actuating arm normally disposed in the path of said card, said arm being movable out of the path of said card in response to insertion of said record medium into said reader for actuating said sensor to provide an output signal indicative of the presence of said card in said reader.

4. Apparatus according to claim 1, wherein said security control device is compatible with outdoor trap security.

5. Apparatus according to claim 1, wherein said security control device is compatible with interference carrier security.

6. Apparatus according to claim 1, wherein said security control device is compatible with synch suppression security.

7. Apparatus according to claim 1, wherein said security control device is compatible with STV.

8. Apparatus according to claim 1, wherein said security control device is compatible with multidistribution service.

9. In apparatus for providing access to an electricontrolled service for predetermined periods of time having a record medium adapted to be encoded with data indicative of a definite time period during which access to said service is to be permitted, a processor for controlling access to the service in response to the data on said card and a security device responsive to said processor, the improvement which comprises a card reader including
- a top plate,
- a bottom plate disposed in parallel spaced relationship to said top plate,
- a plurality of spacer members connected to said top and bottom plates, the area bounded by said top and bottom plates and two of said spacer members being substantially congruent to the cross-section of said record medium for slidably receiving said record medium while preventing skewing thereof, and
- a plurality of magnetically responsive sensors disposed adjacent said channel for sensing signals corresponding to the data encoded on said record medium.

10. Apparatus according to claim 9, further comprising card sensor means for sensing the presence of a card in said channel, said card sensor means having one output signal when said card is present in said channel and another output signal when said card is not present said channel.

11. Apparatus according to claim 10, wherein the card sensor means includes a switch having an actuating arm normally disposed in said channel, said actuating arm being urged out of said channel as said card is inserted therein, and an electrical circuit connected to said switch for providing said one output signal when said actuating arm is disposed in said channel and said other output signal when said actuating arm is urged out of said channel.

12. Apparatus according to claim 9, further comprising an erase head mounted adjacent said channel in alignment with said magnetically responsive sensors, said erase head being responsive to said processor for erasing the data encoded on said record medium in response to the storage of the data encoded on said record medium by said processor.

13. A method of providing access to an electrically controlled service for a predetermined period of time comprising encoding a record medium with data indicative of a predetermined period of time with a CRB encoding format, reading said data indicative of the predetermined period of time encoded on said record medium with a CRB decoder,
- comparing the data indicative of the predetermined period of time with data indicative of present instantaneous time, and
- enabling the security device to permit access to the electrically controlled service only when said present instantaneous time is within said predetermined period of time.

* * * * *